United States Patent
Sotoudeh

(10) Patent No.: US 7,995,968 B2
(45) Date of Patent: Aug. 9, 2011

(54) MEASURING ABSOLUTE TOTAL ISOTROPIC SENSITIVITY OF WIRELESS COMMUNICATION DEVICES IN SCATTERED FIELD CHAMBERS

(75) Inventor: Omid Sotoudeh, Upplands Väsby (SE)

(73) Assignee: Sony Ericsson Mobile Communications AB (SE)

( * ) Notice: Subject to any disclaimer, the term of this patent is extended or adjusted under 35 U.S.C. 154(b) by 400 days.

(21) Appl. No.: 12/369,299

(22) Filed: Feb. 11, 2009

(65) Prior Publication Data

US 2010/0203880 A1  Aug. 12, 2010

(51) Int. Cl.
H04B 17/00 (2006.01)
H04W 24/00 (2009.01)

(52) U.S. Cl. .......... 455/67.12; 455/67.11; 455/423; 455/424

(58) Field of Classification Search .... 455/67.11–67.12, 455/423–424
See application file for complete search history.

(56) References Cited

U.S. PATENT DOCUMENTS

| 7,228,105 | B2 | 6/2007 | Rowell et al. | |
|---|---|---|---|---|
| 7,528,696 | B2 * | 5/2009 | Mickle et al. | 340/10.1 |
| 7,933,363 | B2 * | 4/2011 | Hammersley | 375/340 |
| 2010/0136985 | A1 * | 6/2010 | Inoue et al. | 455/446 |

OTHER PUBLICATIONS

Signal Strength, Wikipedia, 3 pages.*
Kent Madsen, Reverberation Chamber for Mobile Phone Antenna Tests, Flextronics International, 9 pages.*
Masters, G.M. "An Introduction to Mobile Station Over-the-Air Measurements", Technical Paper from *Antenna Measurement Techniques Association Europe Conference*, 2006, pp. 237-242.
International Search Report and Written Opinion, PCT Application No. PCT/IB2009/053382, Dec. 4, 2009.
Andersson, Mats, et al. "Three Fast Ways of Measuring Receiver Sensitivity in a Reverberation Chamber." *IEEE International Workshop on Antenna Technology: Small Antennas and Novel Metamaterials.* (2008): 51-54. Print.
Orlenius, Charlie, et al. "Measurements of Total Isotropic Sensitivity and Average Fading Sensitivity of CDMA Phones in Reverberation Chamber." *IEEE Antennas and Propagation Society Symposium.* 1A. (2005): 409-412. Print.

(Continued)

*Primary Examiner* — Marivelisse Santiago Cordero
*Assistant Examiner* — Munsoon Choo
(74) *Attorney, Agent, or Firm* — Myers Bigel Sibley & Sajovec, PA

(57) ABSTRACT

The absolute total isotropic sensitivity is determined for a communication device receiver circuit that is within a scattered field chamber (SFC) and is receiving communications from a base station simulator. Movement of a mode stirrer device within the SFC is controlled to sequentially move the mode stirrer device to a plurality of different static positions. The different static positions of the mode stirrer device are configured to differently mix polarizations of incident RF fields in the SFC. At each of a plurality of the different static positions of the mode stirrer device, the transmission power level from the base station simulator is varied through a plurality of different transmission power levels. At each of a plurality of the transmission power levels, a bit error rate and a received signal strength at which the communication device receives the communications from the base station simulator are measured. The absolute total isotropic sensitivity of the communication device receiver circuit is determined in response to the measured bit error rate, the measured received signal strength, and the associated transmission power levels.

20 Claims, 8 Drawing Sheets

OTHER PUBLICATIONS

Kildal, Per-Simon, et al. "Correlation and Capacity of MIMO Systems and Mutual Coupling, Radiation Efficiency, and Diversity Gain of Their Antennas: Simulations and Measurements in a Reverberation Chamber." *IEEE Communications Magazine.* 42.1 (2004): 104-112. Print.

Kildal, Per-Simon et al. "Designing Reverberation Chambers for Measurements of Small Antennas and Wireless Terminals: Accuracy, Frequency Resolution, Lowest Frequency of Operation, Loading and Shielding of Chamber." *IEEE First European Conference on Antennas and Propagation.* (2006): 1-6. Print.

Kildal, Per-Simon. "Overview of 6 Years R&D on Characterizing Wireless Devices in Rayleigh Fading Using Reverberation Chambers." *IEEE International Workshop on Antenna Technology: Small and Smart Antennas Metamaterials and Applications.* (2007): 162-165. Print.

* cited by examiner

| PBS | BER | RS-level |
|---|---|---|
| -90.00 | 0.00 | 15.00 |
| -91.00 | 0.00 | 14.00 |
| -92.00 | 0.00 | 13.00 |
| -93.00 | 0.00 | 12.00 |
| -94.00 | 0.00 | 11.00 |
| -95.00 | 0.00 | 10.00 |
| -96.00 | 0.00 | 9.00 |
| -97.00 | 0.00 | 8.00 |
| -98.00 | 0.00 | 7.00 |
| -99.00 | 0.20 | 6.00 |
| -100.00 | 0.09 | 5.00 |
| -101.00 | 0.27 | 4.00 |
| -102.00 | 0.48 | 4.00 |
| -103.00 | 1.18 | 2.00 |
| -104.00 | 2.27 | 1.00 |
| -105.00 | 3.84 | 1.00 |
| -106.00 | 5.77 | 0.00 |

|  | GSM 850/900 | GSM 1800/1900 | UMTS I |
|---|---|---|---|
| Standard deviation (dB) | 0.2 | 0.15 | 0.5 |
| Time (min/channel) | 5 | 3-5 | 3-5 |

FIGURE 8

| Channel | 925 | 4 | 5 | 6 | 38 | 69 | 70 | 71 | 124 |
|---|---|---|---|---|---|---|---|---|---|
| SELD Quick TIS - cam. off | -105,5 | -105,2 | -104,5 | -104,9 | -105,2 | -103,6 | -97,2 | -103,5 | -103,5 |
| SELD Quick TIS - cam. On | -105 | -96,1 | -98,3 | -96,9 | -98,6 | -101,7 | -95,1 | -102,3 | -101,7 |
| ATIS - cam off | -106,3 | -105,2 | -105,2 | -106,1 | -104,3 | -103 | -99,1 | -103,2 | -103,6 |
| ATIS - cam on | -105,1 | -95,1 | -89,2 | -95,9 | -102,1 | -102,5 | -94,8 | -103,7 | -101,8 |

FIGURE 9

MEASURING ABSOLUTE TOTAL ISOTROPIC SENSITIVITY OF WIRELESS COMMUNICATION DEVICES IN SCATTERED FIELD CHAMBERS

FIELD OF THE INVENTION

The present invention relates to the field of wireless communications in general and, more particularly, to measuring characteristics of wireless communication device receivers.

BACKGROUND OF THE INVENTION

Cellular mobile terminals and many other types of wireless communication devices undergo stringent Over The Air (OTA) tests before being released to the market. Promoted by CTIA (Cellular Telecommunications & Internet Association), OTA testing attempts to measure the performance of a device's communication components (antenna, amplifier, receiver and electronics) closer to the environment in which they will be used.

The RF excitations that devices are subjected to are no longer just an RF source in pulsed or continuous wave (CW) modes, but, instead, can be generated by a Base Station Simulator (BSS). The BSS can be configured to communicate using protocols such as Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS), IEEE 801.11a-g standards, Bluetooth, and/or other standard/nonstandard communication protocols.

Two types of chambers that can be used for OTA testing of a communication device are anechoic chambers and Scattered Field Chambers (SFC). Scattered Field Chambers (also called Mode Stir Chamber, reverberation chambers RC, and, in Swedish, modväxlarkammare) may, in some instances, provide faster, cheaper, and/or more reliable measurement setup compared to anechoic chambers.

In contrast to prior device testing techniques that focused on measuring antenna efficiency, OTA testing is often focused on more complex active measurement of a communication device's total radiated power (TRP) and total isotropic sensitivity (TIS). At least some existing techniques for measuring TIS can be particularly complex/difficult to carry-out because they can require accurate testing and measurement at power levels down to about −110 dBm and Block Error Rates (BLER) down to an accuracy of 0.1% units for UMTS communications and an accuracy of 0.5-1% units for GSM communications.

SUMMARY OF THE INVENTION

According to some embodiments of the present invention, a method is provided for determining the absolute total isotropic sensitivity for a communication device receiver circuit that is within a scattered field chamber (SFC) and is receiving communications from a base station simulator. Movement of a mode stirrer device within the SFC is controlled to sequentially move the mode stirrer device to a plurality of different static positions. The different static positions of the mode stirrer device are configured to differently mix polarizations of incident RF fields in the SFC. At each of a plurality of the different static positions of the mode stirrer device, the transmission power level from the base station simulator is varied through a plurality of different transmission power levels. At each of a plurality of the transmission power levels, a bit error rate and a received signal strength at which the communication device receives the communications from the base station simulator are measured. The absolute total isotropic sensitivity of the communication device receiver circuit is determined in response to the measured bit error rate, the measured received signal strength, and the associated transmission power levels.

In some further embodiments, measurement of the bit error rate includes measuring a frame error rate at which the mobile terminal receives the communications from the base station simulator at the associated transmission power level.

In some further embodiments, measurement of the bit error rate includes measuring a block error rate at which the mobile terminal receives the communications from the base station simulator at the associated transmission power level.

In some further embodiments, determination of the total isotropic sensitivity includes: for each of the plurality of different static positions of the mode stirrer device, a combined chamber and antenna loss (CAL) value is determined using the measured received signal strength and the associated transmission power level from the base station simulator; for each of the plurality of different static positions of the mode stirrer device, an average CAL value is determined using the determined CAL values that correspond to non-zero bit error rate measurements; and an isotropic sensitivity of the communication device receiver circuit is determined using the average CAL value determined for each of the plurality of different static positions of the mode stirrer device.

In some further embodiments, for each of the plurality of different static positions of the mode stirrer device, the CAL value is determined based on a difference between the measured received signal strength and the associated transmission power level from the base station simulator.

In some further embodiments, determination of the isotropic sensitivity includes, for each of the plurality of different static positions of the mode stirrer device, determining the isotropic sensitivity of the communication device receiver circuit using the measured bit error rate and the average CAL value.

In some further embodiments, determination of the isotropic sensitivity further includes, for each of the plurality of different static positions of the mode stirrer device, determining the isotropic sensitivity of the communication device receiver circuit based on a difference between the measured bit error rate and the average CAL value.

In some further embodiments, determination of the isotropic sensitivity further includes, carrying out a linear curve fit through a plurality of the isotropic sensitivity values determined for the plurality of different static positions of the mode stirrer device.

In some further embodiments, the method further includes determining an active antenna efficiency of the communication device receiver circuit receiving communications from the base station simulator, and determining the absolute total isotropic sensitivity of the communication device receiver circuit in response to the determined isotropic sensitivity and the determined active antenna efficiency.

In some further embodiments, determination of the absolute total isotropic sensitivity of the communication device receiver circuit includes adding the determined isotropic sensitivity and the determined active antenna efficiency.

In some further embodiments, determination of the active antenna efficiency of the communication device receiver circuit includes, while maintaining a substantially constant transmission power level from the base station simulator, moving the mode stirrer device to mix polarizations of incident RF fields in the SFC while measuring a received signal strength at which the communication device receives the communications from the base station simulator, averaging a plurality of the measurements of the received signal strength over time, and determining the active antenna efficiency based on the averaged received signal strength.

In some further embodiments, the method further includes determining a transfer function of the SFC. The active antenna efficiency is then determined based on a difference between the transmission power level from the base station simulator and a sum of the transfer function of the SFC and the averaged received signal strength.

Some other embodiments are directed to a system that includes a base station simulator and a TIS measurement computer. The base station simulator is configured to communicate to a communication device receiver circuit in a scattered field chamber (SFC). The TIS measurement computer is configured as follows: to control movement of a mode stirrer device within the SFC to sequentially move the mode stirrer device to a plurality of different static positions, wherein the different static positions of the mode stirrer device are configured to differently mix polarizations of incident RF fields in the SFC; at each of a plurality of the different static positions of the mode stirrer device, to vary the transmission power level from the base station simulator through a plurality of different transmission power levels; at each of a plurality of the transmission power levels, to measure a bit error rate and a received signal strength at which the communication device receives the communications from the base station simulator; and to determine an absolute total isotropic sensitivity of the communication device receiver circuit in response to the measured bit error rate, the measured received signal strength, and the associated transmission power levels.

In some further embodiments, the TIS measurement computer is further configured as follows: for each of the plurality of different static positions of the mode stirrer device, to determine a combined chamber and antenna loss (CAL) value based on a difference between the measured received signal strength and the associated transmission power level from the base station simulator; for each of the plurality of different static positions of the mode stirrer device, to determine an average CAL value using the determined CAL values that correspond to non-zero bit error rate measurements; and to determine an isotropic sensitivity of the communication device receiver circuit using the average CAL value determined for each of the plurality of different static positions of the mode stirrer device.

In some further embodiments, the TIS measurement computer is further configured, for each of the plurality of different static positions of the mode stirrer device, to determine the isotropic sensitivity of the communication device receiver circuit based on a difference between the measured bit error rate and the average CAL value.

In some further embodiments, the TIS measurement computer is further configured to determine an active antenna efficiency of the communication device receiver circuit receiving communications from the base station simulator, and to determine the absolute total isotropic sensitivity of the communication device receiver circuit in response to the determined isotropic sensitivity and the determined active antenna efficiency.

In some further embodiments, the TIS measurement computer is further configured to determine the absolute total isotropic sensitivity of the communication device receiver circuit based on adding the determined isotropic sensitivity and the determined active antenna efficiency.

In some further embodiments, the TIS measurement computer is further configured, while a substantially constant transmission power level from the base station simulator is maintained, to move the mode stirrer device to mix polarizations of incident RF fields in the SFC while measuring a received signal strength at which the communication device receives the communications from the base station simulator, to average a plurality of the measurements of the received signal strength over time, and to determine the active antenna efficiency based on the averaged received signal strength.

In some further embodiments, the TIS measurement computer is further configured to determine a transfer function of the SFC, and to determine the active antenna efficiency based on a difference between the transmission power level from the base station simulator and a sum of the transfer function of the SFC and the averaged received signal strength.

Some other embodiments of the present invention are directed to a computer program product for determining characteristics of a communication device receiver circuit within a scattered field chamber (SFC) that is receiving communications from a base station simulator. The computer program product includes a computer-readable storage medium having computer-readable program code embodied in the medium. The computer-readable program code includes: computer readable program code configured to control movement of a mode stirrer device within the SFC to sequentially move the mode stirrer device to a plurality of different static positions, wherein the different static positions of the mode stirrer device are configured to differently mix polarizations of incident RF fields in the SFC; computer-readable program code configured to, at each of a plurality of the different static positions of the mode stirrer device, vary the transmission power level from the base station simulator through a plurality of different transmission power levels; computer readable program code configured to, at each of a plurality of the transmission power levels, measure a bit error rate and a received signal strength at which the communication device receives the communications from the base station simulator; and computer readable program code configured to determine an absolute total isotropic sensitivity of the communication device receiver circuit in response to the measured bit error rate, the measured received signal strength, and the associated transmission power levels.

Other apparatus, systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings:

FIG. 8 illustrates a table of the exemplary times that may be observed when measuring each channel of a mobile terminal;

FIG. 9 illustrates a table that shows measurements that were carried out on a mobile terminal having a camera that, when powered on, causes undesirable effects on the receiver chain of the mobile terminal;

DETAILED DESCRIPTION OF EMBODIMENTS OF THE INVENTION

Figure 1:
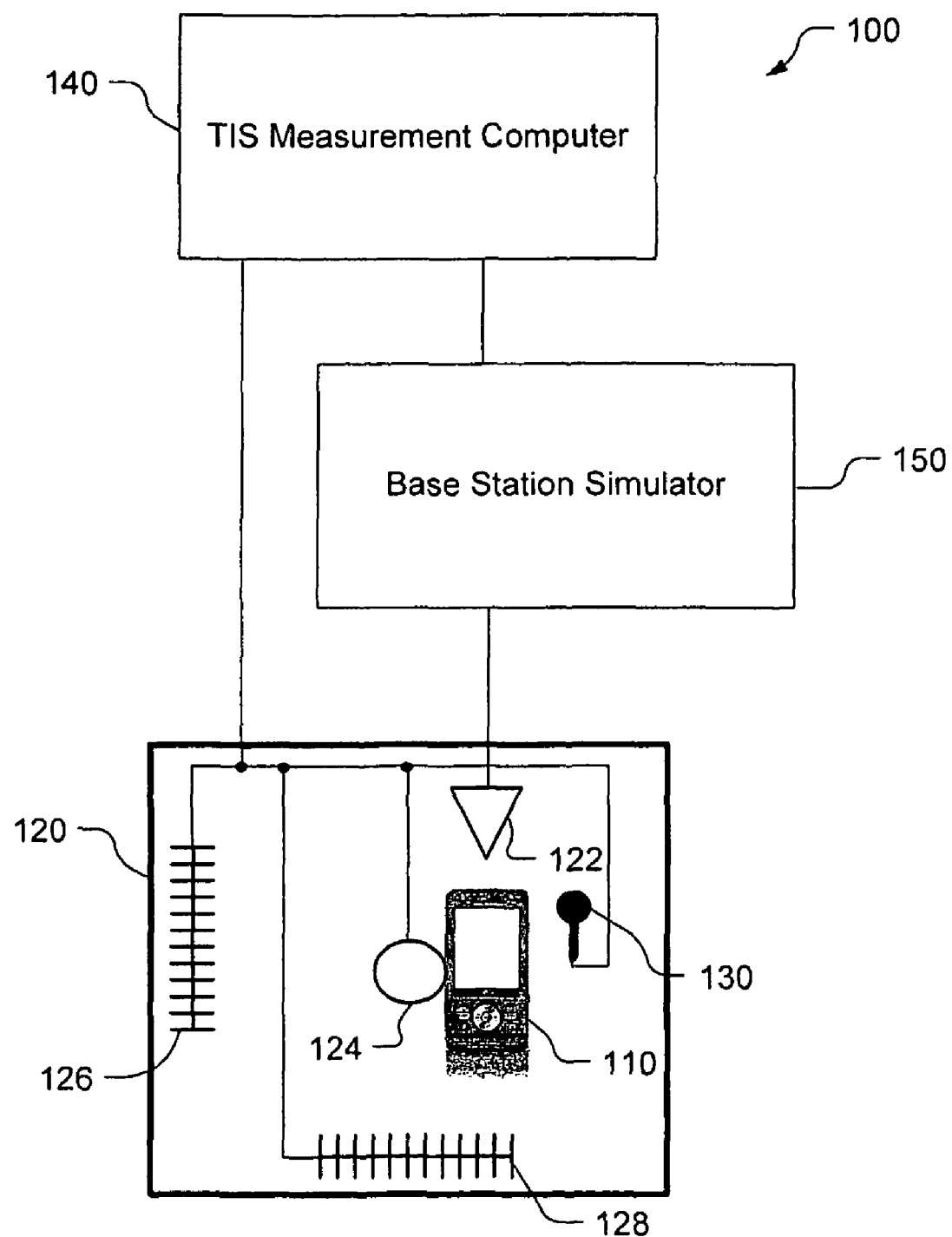
FIG. 1 is a block diagram of a system that measures total isotropic sensitivity of a communication device, such as a mobile terminal, in accordance with some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

As used herein, a "wireless mobile terminal" or, abbreviated, "terminal" includes, but is not limited to, any electronic device that is configured to receive radio frequency communication signals. Example terminals include, but are not limited to, cellular phones, PDAs, and mobile computers that are configured to communicate with other communication devices.

FIG. 1 illustrates an exemplary system 100 that measures TIS of a mobile terminal 110 in accordance with some embodiments of the present invention. Referring to FIG. 1, the mobile terminal 110 is positioned within a Scattered Field Chamber (SFC) 120, which can have conductive walls, A base station simulator 150 is configured to communicate with the mobile terminal 100 through an antenna 122 that is within the SFC 120 and proximately located to the mobile terminal 100.

The base station simulator 150 can be configured to generate RF communication signaling through the antenna 152 according to one or more protocols which may include, but are not limited to, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS), IEEE 801.11a-g standards, Bluetooth, and/or other standard/nonstandard communication protocols. The base station simulator 150 may include, but is not limited to, an Agilent 8960 type base station simulator which can operate to test fast fading environments. The selection and/or timing of protocol steps that are to carried out by the base station simulator 150 may be controlled by the TIS measurement computer 140.

The mobile terminal 110 may be mounted to an actuator 124, within the SFC 120, that can be configured to rotate and/or reposition the mobile terminal 110 relative to the antenna 122. The TIS measurement computer 140 may be configured to regulate the actuator 124 (e.g., control rotation of an rotational assembly and/or control positioning of a movable arm) to control the angle and/or location of the mobile terminal 100 relative to the antenna 122.

One or more mode stirrer devices 126 and 128 may be included within the SFC 120. When included, the mode stirrers 126 and 128 may be configured to, for example, mix the polarizations of incident RF fields. The mode stirrers 126 and 128 may move, such as by rotating, to cause the RF fields in the vicinity of the mobile terminal 110 to vary in a uniformly but randomly in space and time. For example, the mode stirrers 126 and 128 may cause the RF fields at many locations within the SFC 120 to have about the same maximum and average RF field strength over time (e.g., over one rotation of the mode stirrers 126 and 128). Alternatively or additionally, the mode stirrers 126 and 128 may be configured to absorb the RF field near the mobile terminal 110 to cause fast fading of the RF field strength so as to simulate multi-path interference and/or other effects of a fast fading (e.g., urban type) environment. The mode stirrers 126 and 128 may, for example, be coated with an absorbing material and/or a dielectric, and may be configured to rotate/move like a rotatable fan, pendulum, etc. Movement of the mode stirrers 126 and 128 may be controlled by the TIS measurement computer 140. For example, the TIS measurement computer 140 may start and stop movement of the mode stirrers 126 and 128 during various of the test operations described below.

A calibration probe 130 may be included within the SFC 120 adjacent to the mobile terminal 110 and connected to the TIS measurement computer 140 and/or the base station controller 150 for use thereby to, for example, calibrate the output power levels and power measurements by the base station simulator 150, to measure path losses between the base station simulator 150 and the antenna 122, and/or to measure space losses between the SFC antenna 122 and an antenna of the mobile terminal 110.

In accordance with some embodiments, the TIS measurement computer 100 is configured to generate a sensitivity curve and determine active antenna efficiency. To determine the sensitivity curve, isotropic sensitivity and combined Chamber and Antenna Losses (CAL) can be determined together during a common measurement operation. The isotropic sensitivity found by this operation can correspond to the conducted sensitivity plus only a loss factor which represents the losses in the mobile terminal 110, including from an antenna through a signal pathway to a RF receiver of the mobile terminal 110. These measurement can thereby represent the active antenna efficiency.

After determining the active antenna efficiency, it can be subtracted from the combined Chamber and Antenna Losses to determine the Isotropic sensitivity level at the air-antenna interface of the mobile terminal 110.

Various different embodiments are described below for how isotropic sensitivity and CAL can be determined by the TIS measurement computer 100 and used to determine TIS for the mobile terminal 110. As will be described below, a curve fitting algorithm can be used to determine TIS and/or fading TIS, which may increase the measurement accuracy and/or increase redundancy for measurements of mobile terminals or other communication devices having unknown properties.

In some embodiments, the receiver signal level of the mobile terminal 110 may be measured and used to determine TIS. The received signal level may be measured as Received Signal Strength Indication (RSSI) for GSM protocol communications, and as Received Signal Code Power (RSCP) for UMTS) protocol communications, and which are collectively referred to below as the "Received Signal (RS)."

To find the CAL, the TIS measurement computer 140 creates a static environment in the chamber by freezing (i.e., stopping movement of) the stirrers 126 and 128 and carrying out measurements to generate a sensitivity curve. The sensitivity curve is generated by reducing the base station simulator power level (PBS) and registering the bit error rate (BER), such as the frame error rate (FER) and/or the block error rate (BLER) and the RS. Through these measurements, a determination can be made as to whether or not the static environment within the SFC 120 resembles a desired isotropic environment for TIS measurements.

Figure 2:
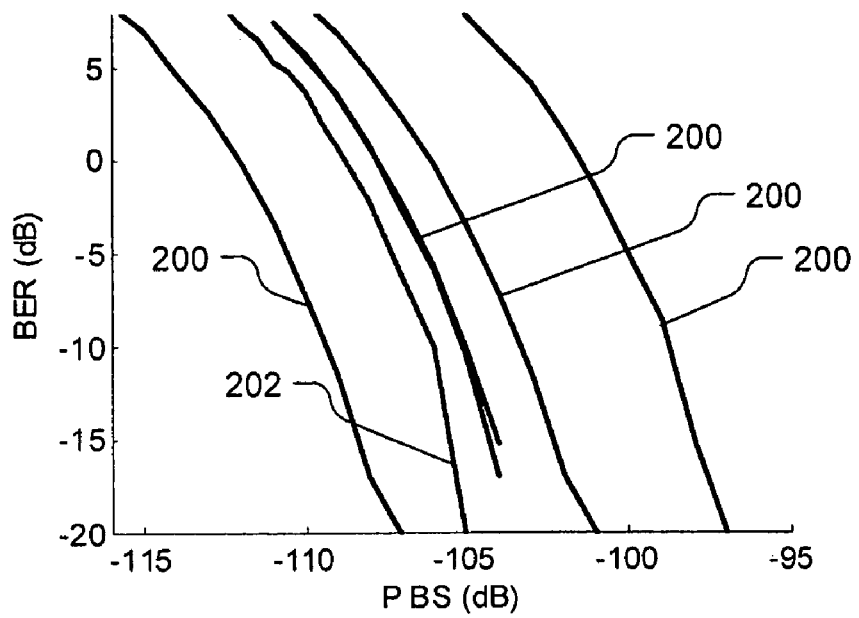
FIG. 2 is a graph of sensitivity curves of a mobile terminal for each of a plurality of different measurement locations within the scattered field chamber of FIG. 1.
Figure 3:
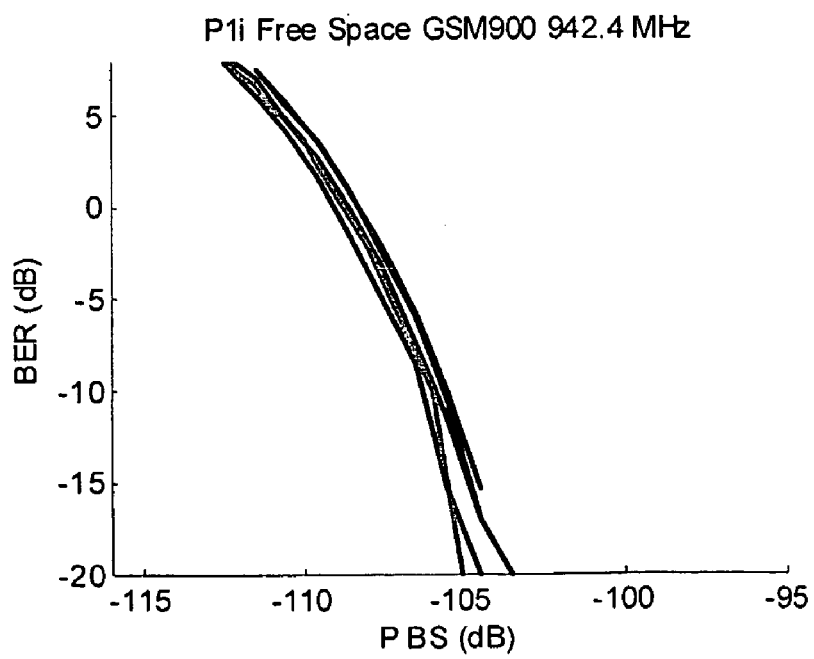
FIG. 3 is a graph in which the sensitivity curves of FIG. 2 have been overlaid on one another.

FIG. 2 is a graph of sensitivity curves 200 of the mobile terminal 110, operating in the GSM 900 band, that were measured at each of a plurality of different measurement locations within the SFC 120 of FIG. 1. The sensitivity curve 202 corresponds to the conducted sensitivity of the mobile terminal 110 operating at 942.4 MHz. FIG. 3 is a graph in which the sensitivity curves 200 and 202 of FIG. 2 have been overlaid on one another.

Referring to FIGS. 2 and 3, the curve 202 can be compared to several randomly measured curves in the static SFC 120. Although the stirrers 126 and 128 are not moving to provide a static environment in the SFC 120, it may continue to be important to measure each point in the curves 200 and 202 with a sufficiently large number of bits in order to ensure that each point in the curve has converged to a specified low standard deviation. The number of measurement points may be kept relatively low, thereby saving measurement time, by using curve fitting algorithms through the measured points.

Through the measurements, the receiver circuitry of the mobile terminal 110 can be robustly characterized over a wide operational environment by measuring the entire sensitivity curve and finding the receiver sensitivity from this curve. Another approach that can be used by the TIS measurement computer 140 is to optimally hop between measurement points in the operational testing environment, and which can include averaging many more measurement values at each measurement location in order to reach a sufficiently accurate value.

As seen in FIGS. 2 and 3, the conductive curve 202 and the static curves 200 in the SFC 120 have the same variation. There is however one major difference: the static curves 200 measured in the SFC 120, the entire receiver signal pathway of the mobile terminal 110, including the antenna, the striplines and the LNA chain, is included in the measurements. This means that all the receiver characteristics of the mobile terminal 110 are included and thus effects such as de-sense may be readily characterized through these measurements.

Operations can be carried out by the TIS measurement computer 140 to quantify the differences between the TIS and the measured sensitivity in the curves 200 and 202 will now be described.

Combined Antenna and Chamber Losses (CAL):

The CAL is the difference between the base station power PBS and the receiver signal level RS, and can be represented by the following equation:

$$CAL(stop) = P_{BS}(stop) - RS(stop)$$

The CAL(stop) is calculated for each stop (stirrer stop position) in the SFC 120. From these values, the average CAL is then calculated for each position by extracting the curve points which represent non-zero RSSI and BER values (noting that RSSI 0 equals −110 dBm and may be the lowest value because the exemplary receiver is saturated at lower values).

Figures 4, 5:
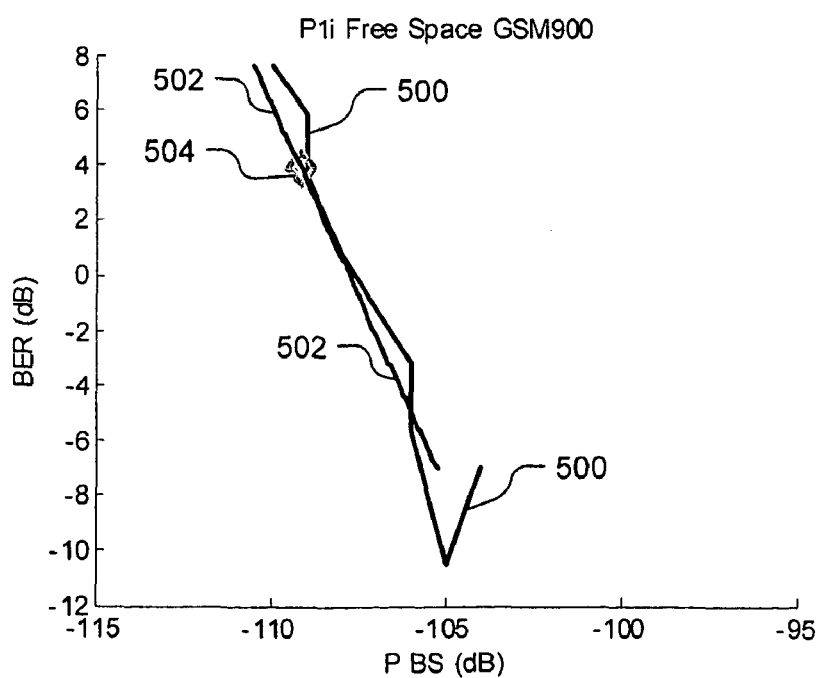
FIG. 4 illustrates an exemplary table of the output power of the base station simulator and the measured BER and RS-level of the mobile terminal for one stop in the scattered field chamber of FIG. 1 in accordance with some embodiments.
FIG. 5 is a graph of an exemplary isotropic sensitivity curve and a linear curve fit through the measurement data, along with a calculated sensitivity and 2.49 BER point in accordance with some embodiments.

FIG. 4 illustrates an exemplary table of the output power of the base station simulator 150 and the measured BER and RS-level of the mobile terminal 110 for one stop position of the stirrers 126 and 128. Using these measured values, the CAL vector can be determined as: CAL=5, 5, 5, 4, 5, 5, 4, and the average CAL is determined to be 4.7 dB. The TIS measurement computer 140 can repetitively carry out these operations for different stirrer stop (static) positions in order to increase the measurement accuracy.

Additional operations can be carried out to measure the CAL at a higher level where the function PBS(RS) has a totally linear variation. The measured values should be averaged over the same number of samples. The BER=0 values can be measured with a much lower number of samples. The number of sample effects the operational measurement time.

Isotropic Sensitivity (IS):

The Isotropic sensitivity curve is determined by the TIS measurement computer 140 as the difference between the measured sensitivity curve and the averaged CAL as explained above, and can be represented by the following equation:

$$IS_{ant}(s)=P_s(s)-\overline{CAL(s)}.$$

Once the IS curve is calculated, the IS-value is found by linear curve fitting. For example, FIG. 5 is a graph of an isotropic sensitivity curve 500 and further illustrates a linear curve fit 502 through the measurement data along with a calculated sensitivity and 2.49 BER point 504 along same.

Active Antenna Efficiency:

In another operational step, the power from the base station simulator 150 PBS is fixed (static) and the active antenna efficiency is determined by the TIS measurement computer 140. This determination may be carried out by registering the receiver signal level and averaging over it, under very slow signal fading. These values are averaged until the process has converged and the final averaged value and the Chamber Transfer Function $\overline{CTF}$ are subtracted from the PBS. These calculations can be represented by the following equation:

$$e_{ant}^{active} = P_{BS} - \overline{CTF} - \frac{1}{N}\sum_N RSSI.$$

The term $\overline{CTF}$ is defined as the losses from the base station simulator 150 to the antenna of the mobile terminal 110, which can correspond to the SFC 120 loss. The accuracy of this calculation may be increased by repeating the measurements and associated calculations for different base station simulator 150 output power PBS values.

Figure 6:
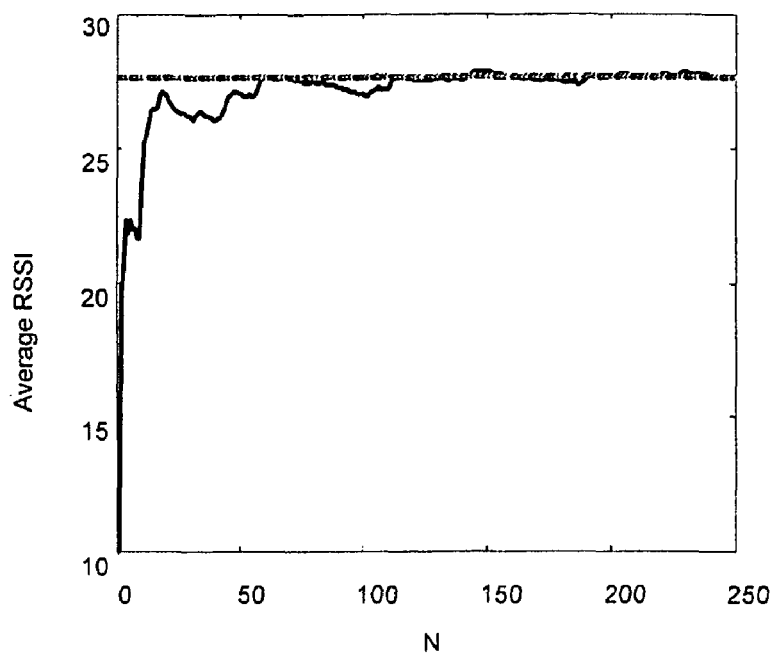
FIG. 6 is a graph of exemplary average RSSI measurements for a mobile terminal that is subjected to constant slow stirring via one or more field stirrers, and where N represents the number of RSSI values used for the averaging.
Figure 7:
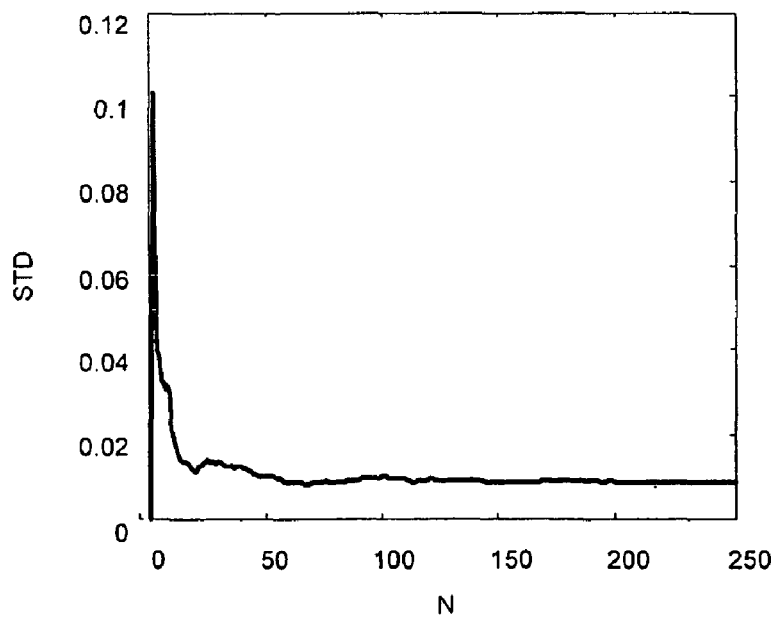
FIG. 7 is a graph of an exemplary standard deviation of the average RSSI measurements of FIG. 6.

FIG. 6 is a graph of exemplary average RSSI measurements for a mobile terminal that is subjected to constant slow stirring via defined movement of the field stirrers 126 and 128, and where the term N represents the number of RSSI values used for the averaging. FIG. 7 is a graph of the standard deviation of the average RSSI measurements of FIG. 6.

Absolute Total Isotropic Sensitivity:

The absolute Total Isotropic Sensitivity (ATIS) can be determined by the TIS measurement computer 140 based on the following equation:

ATIS=IS+$e_{ant}^{active}$, where the component values thereof can be determined as explained above.

Measurement Time:

In some embodiments, the total time needed for the described measurement can depend heavily upon the particular type of communication device that is being tested and the desired accuracy that is to be obtained through the measurements. The table below shows the average ATIS time for rather good measurement repeatability. This accuracy may improved by a numerous of factors, such as by increasing the number of sensitivity curves, by using higher resolution in the measured data of the curves, or by increasing the number of RS samples.

FIG. 8 illustrates a table of the approximate times that have been observed when measuring each channel of a mobile terminal, such as the mobile terminal 110. The measurement times in minutes/channel are shown for GSM 850/900, GSM 1800/1900, and UMTS 1.

Measuring De-Sense Effects:

The operations associated with various embodiments may allow for very quick and/or accurate desense measurements. Desense measurements can be very useful for finding the effects that various components of a communication device have on the receiver chain of the communication device. FIG. 9 illustrates a table that shows measurements that were carried out in a SFC on a mobile terminal having a camera that is powered on and is causing undesirable effects on the receiver chain of the mobile terminal. The mobile terminal has also been measured in an anechoic chamber (SELD) to measure TIS to an accuracy on the order of 1-2 dB.

Figure 10:
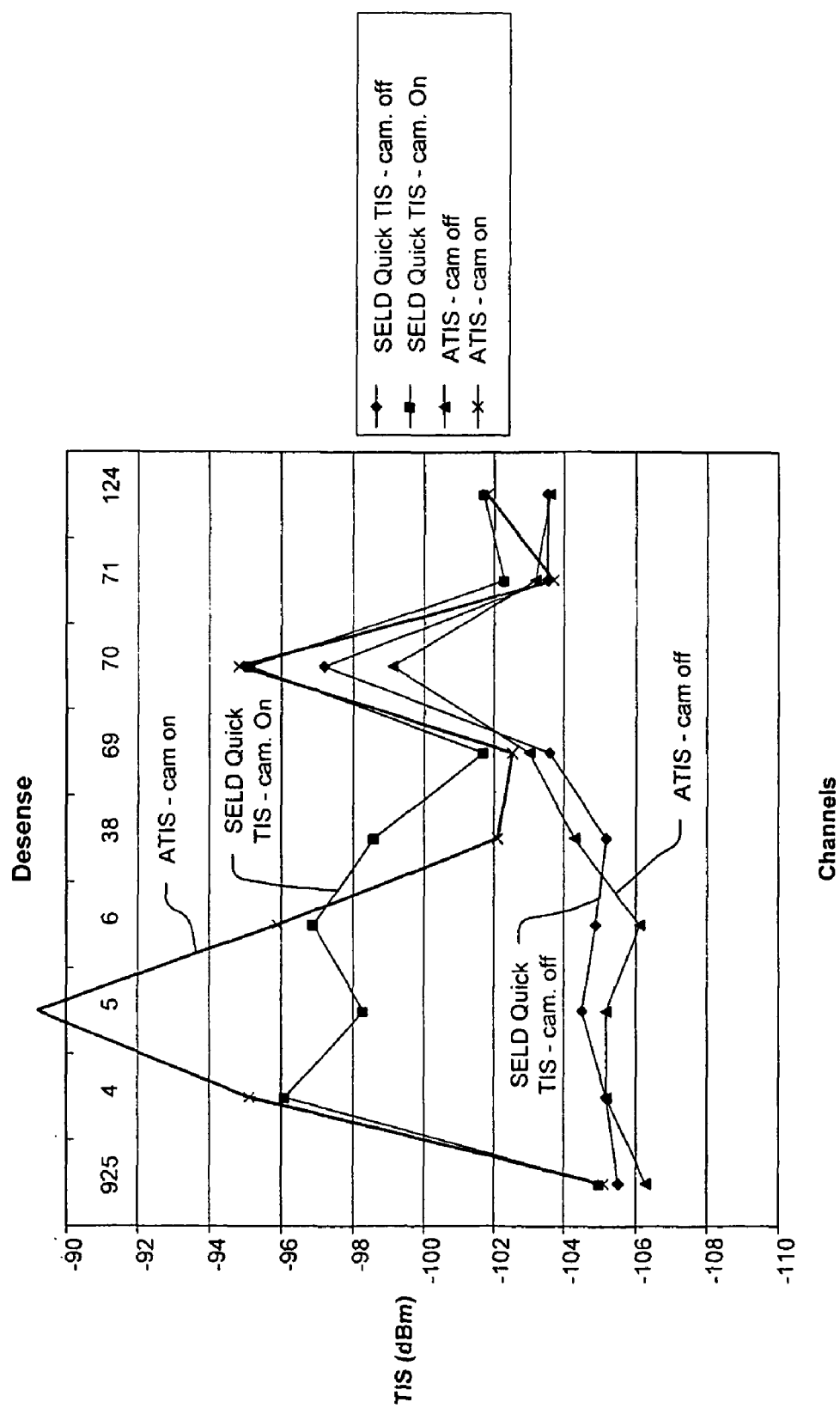
FIG. 10 is a graph of TIS measurements for various channels of an exemplary mobile terminal that were taken in an anechoic chamber with a camera thereof powered on and off, and that were taken in a SFC with the camera powered on and off.

Referring to FIG. 9, data is provided for measurements for various channels of a mobile terminal which were taken in an anechoic chamber with the camera powered off ("SELD Quick TIS—cam. off), in the anechoic chamber with the camera powered on ("SELD Quick TIS—cam. On), in a SFC with the camera powered off ("ATIS—cam off"), and in the SFC with the camera powered on ("ATIS—cam on"). Referring to these measurements, it is seen that the absolute desense effect is quickly measured with ATIS and that the dynamic range of the algorithm allows for these quick measurements. This data is also visually illustrated in the graphs of FIG. 10.

Measurement Accuracy:

In general, the measurement accuracy and repeatability of measurements in the SFC depend upon the number of sample measurements that are taken on a communication device and, therefore, a more accurate result can be obtained by increasing the total measurement time and associated number of measurements. For total radiated power TRP, it has been observed that 1000 to 2000 samples can provide a high level of repeatability in the measurement of ATIS.

This finding may also hold for anechoic chamber measurements where a more dense measurement grid can lead to a more accurate result. The anechoic measurement setup adopted by CTIA has a measurement uncertainty of ±2 dB for K=2, where a large contribution to this error is the quit zone ripple of ±0.5 dB.

Further Exemplary ATIS Measurement Operations:

Various operations and methods that may be carried out by the TIS measurement computer 140 and the base station simulator 150 of FIG. 1 to measure ATIS in accordance with some embodiments of the present invention will now be described. Some of these operations are also illustrated in the flowchart of FIGS. 11A-B which are referenced below.

For purposes of explanation of these exemplary operations only, the following input parameters are defined to have the following meanings:

| Input parameters | Description |
| --- | --- |
| N_samples | Number of samples in step [0086]. |
| N_$P_S$ | Number of station power levels in step [0086]. |
| N_curves | Number of curves in steps [0086]-[0092]. |
| BER_level | The level at which BER should be calculated |
| P_S_rot | Power of the station |
| V_stir | Stirrer voltages |
| N_rssi | Number of RSSI registering |

Figure 11A:
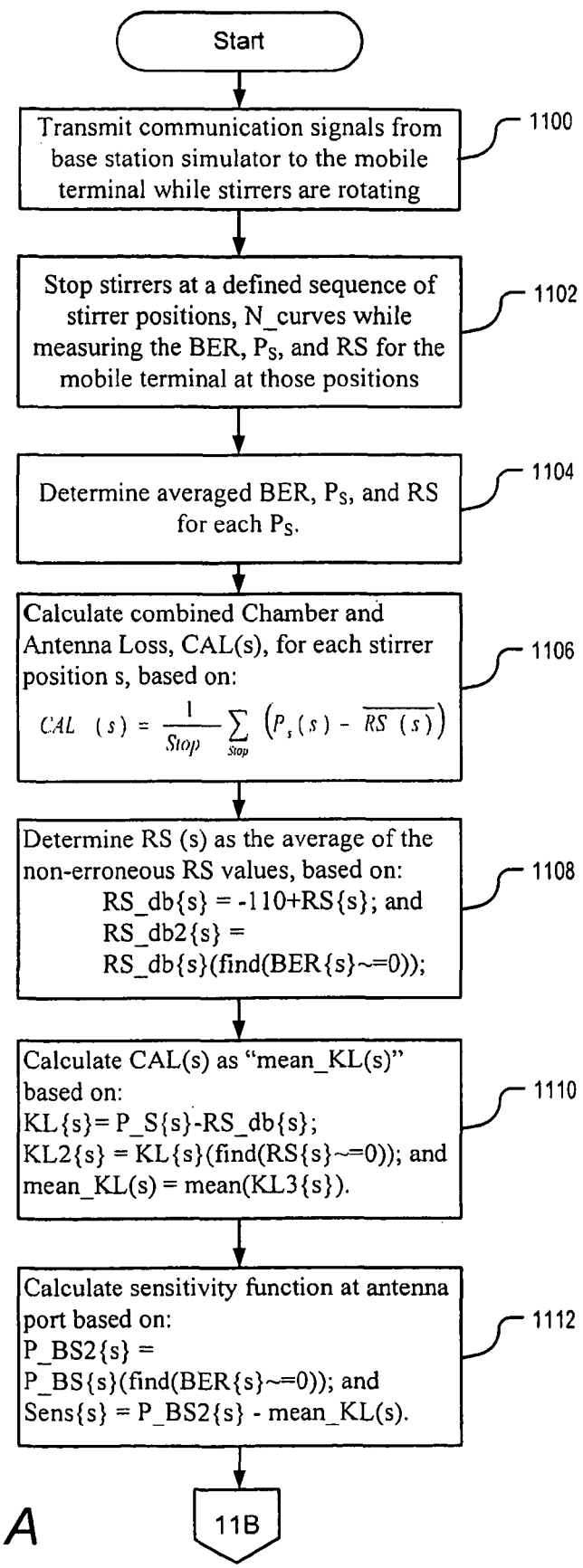
FIGS. 11A-B illustrate a flowchart showing exemplary operations and methods that may be carried out by the TIS measurement computer and the base station simulator of FIG. 1 in accordance with some embodiments of the present invention.
Figure 11B:
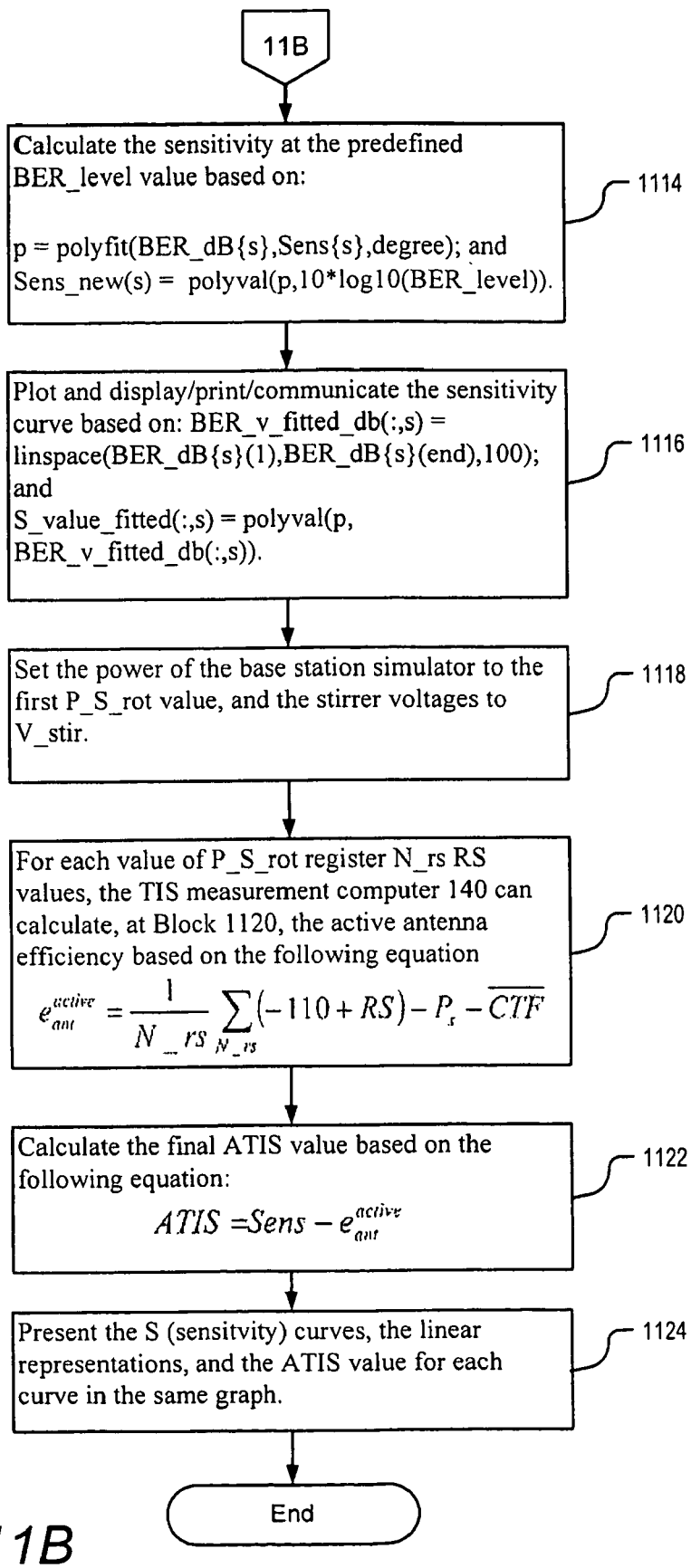

Referring to FIGS. 11A-B, at block 1100, the base station simulator 150 transmits signaling to the mobile terminal 110 to establish a communication connection thereto while the stirrers 126 and 128 are rotating.

At block 1102, the stirrers 126 and 128 are sequentially stopped at a defined number of defined stirrer positions, corresponding to a desired number N_curves, while the BER, $P_S$ (transmission power level of the base station simulator 150), and RS are measured for the mobile terminal 110 at those stirrer positions. For each position the measurements are used to form the curve in N_$P_S$ (i.e. number of station power levels), and for each power level in N_samples. The TIS measurement computer 140 then determines (block 1104) the N_samples averaged BER, $P_S$, and RS for each $P_S$.

The TIS measurement computer 140 then calculates at Block 1106 the combined Chamber and Antenna Loss, CAL (s), for each stirrer position s, based on the following equation:

$$CAL(s) = \frac{1}{\text{Stop}}\sum_{Stop}(P_s(s) - \overline{RS(s)})$$

The term RS(s) is the average of the non-erroneous RS values, and can be determined in Block 1108 as follows:

RS_db{s}=−110+RS{s}; and

RS_db2{s}=RS_db{s}(find(BER{s}~=0)), where the term "~=" means approximately equal.

The CAL(s) can be denoted as mean_KL{s} and can be calculated in Block 1110 as follows:

KL{s}=P_S{s}−RS_db{s};

KL2{s}=KL{s}(find(RS{s}~=0)); and mean_KL(s)=mean(KL3{s}).

The TIS measurement computer 140 can then calculate at Block 1112 the sensitivity function at the antenna port as follows:

P_BS2{s}=P_BS{s}(find(BER{s}~=0)); and

Sens{s}=P_BS2{s}−mean_KL(s).

The TIS measurement computer 140 can then calculate at Block 1114 the sensitivity at the predefined BER_level value as follows:

p=polyfit(BER_dB{s},Sens{s},degree); and

Sens_new(s)=polyval(p,10*log 10(BER_level)).

The TIS measurement computer 140 can then use this data at Block 1116 to plot and display/print/communicate the sensitivity curve as follows:

BER_v_fitted_db(:,s)=linspace(BER_dB{s}(1), BER_dB{s}(end),100); and

S_value_fitted(:,s)=polyval(p,BER_v_fitted_db(:,s)).

The TIS measurement computer 140 can then, at Block 1118, set the power of the base station simulator 150 to the first P_S_rot value, and the stirrer 126 and 128 voltages to V_stir.

For each value of P_S_rot register N_rs RS values, the TIS measurement computer 140 can calculate, at Block 1120, the active antenna efficiency based on the following equation:

$$e_{ant}^{active} = \frac{1}{\text{N\_rs}}\sum_{N\_rs}(-110 + RS) - P_s - \overline{CTF},$$

where CTF is the SFC 120 transfer function coming from the calibration files. The active antenna efficiency and/or its average may be continuously displayed to a user.

The TIS measurement computer 140 can calculate, at Block 1122, the final ATIS value based on the following equation:

ATIS=Sens−$e_{ant}^{active}$

The TIS measurement computer 140 may display, at Block 1124, the S-curves, the linear representations, and the ATIS value for each curve in the same graph.

It is to be understood that although the exemplary measurement system 100 has been illustrated in FIG. 1 with various separately defined elements for ease of illustration and discussion, the invention is not limited thereto. Instead, various functionality described herein in separate functional elements may be combined within a single functional element and, vice versa, functionally described herein in single functional elements can be carried out by a plurality of separate functional elements.

Moreover, although exemplary embodiments have been described in the context of measuring ATIS for a mobile terminal, it is to be understood that the apparatus, operations, and methods may be used to measure the receiver of any type of communication device.

As will be appreciated by one of skill in the art, the present invention may be embodied as apparatus (measurement computers, simulators, mobile terminals), methods, and computer program products. Accordingly, the present invention may take the form of an entirely hardware embodiment, a software embodiment or an embodiment combining software and hardware aspects all generally referred to herein as a "circuit" or "module." It will be understood that each block of the flowchart illustrations and/or block diagrams, and combinations of blocks in the flowchart illustrations and/or block diagrams, described herein can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can be recorded on a computer-readable storage medium, such as on hard disks, CD-ROMs, optical storage devices, or integrated circuit memory devices. These computer program instructions on the computer-readable storage medium direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of determining characteristics of a communication device receiver circuit within a scattered field chamber (SFC) that is receiving communications from a base station simulator, the method comprising:
controlling movement of a mode stirrer device within the SFC to sequentially move the mode stirrer device to a plurality of different static positions, wherein the different static positions of the mode stirrer device are configured to differently mix polarizations of incident RF fields in the SFC;
at each of a plurality of the different static positions of the mode stirrer device, varying the transmission power level from the base station simulator through a plurality of different transmission power levels;
at each of a plurality of the transmission power levels, measuring a bit error rate and a received signal strength at which the communication device receives the communications from the base station simulator; and
determining an absolute total isotropic sensitivity of the communication device receiver circuit in response to the measured bit error rate, the measured received signal strength, and the associated transmission power levels.

2. The method of claim 1, wherein measurement of the bit error rate comprises measuring a frame error rate at which the mobile terminal receives the communications from the base station simulator at the associated transmission power level.

3. The method of claim 1, wherein measurement of the bit error rate comprises measuring a block error rate at which the mobile terminal receives the communications from the base station simulator at the associated transmission power level.

4. The method of claim 1, wherein determination of the total isotropic sensitivity comprises:
for each of the plurality of different static positions of the mode stirrer device, determining a combined chamber and antenna loss (CAL) value using the measured received signal strength and the associated transmission power level from the base station simulator;
for each of the plurality of different static positions of the mode stirrer device, determining an average CAL value using the determined CAL values that correspond to non-zero bit error rate measurements; and
determining an isotropic sensitivity of the communication device receiver circuit using the average CAL value determined for each of the plurality of different static positions of the mode stirrer device.

5. The method of claim 4, wherein:
for each of the plurality of different static positions of the mode stirrer device, the CAL value is determined based on a difference between the measured received signal strength and the associated transmission power level from the base station simulator.

6. The method of claim 4, wherein determination of the isotropic sensitivity comprises:
for each of the plurality of different static positions of the mode stirrer device, determining the isotropic sensitivity of the communication device receiver circuit using the measured bit error rate and the average CAL value.

7. The method of claim 6, wherein determination of the isotropic sensitivity further comprises:
for each of the plurality of different static positions of the mode stirrer device, the isotropic sensitivity of the communication device receiver circuit is determined based on a difference between the measured bit error rate and the average CAL value.

8. The method of claim 6, wherein determination of the isotropic sensitivity further comprises:
carrying out a linear curve fit through a plurality of the isotropic sensitivity values determined for the plurality of different static positions of the mode stirrer device.

9. The method of claim 4, further comprising:
determining an active antenna efficiency of the communication device receiver circuit receiving communications from the base station simulator; and
determining the absolute total isotropic sensitivity of the communication device receiver circuit in response to the determined isotropic sensitivity and the determined active antenna efficiency.

10. The method of claim 9, wherein determination of the absolute total isotropic sensitivity of the communication device receiver circuit comprises adding the determined isotropic sensitivity and the determined active antenna efficiency.

11. The method of claim 9, wherein determination of the active antenna efficiency of the communication device receiver circuit comprises:
while maintaining a substantially constant transmission power level from the base station simulator, moving the mode stirrer device to mix polarizations of incident RF fields in the SFC while measuring a received signal strength at which the communication device receives the communications from the base station simulator;
averaging a plurality of the measurements of the received signal strength over time; and
determining the active antenna efficiency based on the averaged received signal strength.

12. The method of claim 11, further comprising:
determining a transfer function of the SFC, and wherein the active antenna efficiency is determined based on a difference between the transmission power level from the base station simulator and a sum of the transfer function of the SFC and the averaged received signal strength.

13. A system comprising:
a base station simulator that is configured to communicate to a communication device receiver circuit in a scattered field chamber (SFC);
a TIS (Total Isotropic Sensitivity) measurement computer that is configured as follows:
to control movement of a mode stirrer device within the SFC to sequentially move the mode stirrer device to a plurality of different static positions, wherein the different static positions of the mode stirrer device are configured to differently mix polarizations of incident RF fields in the SFC;
at each of a plurality of the different static positions of the mode stirrer device, to vary the transmission power level from the base station simulator through a plurality of different transmission power levels;
at each of a plurality of the transmission power levels, to measure a bit error rate and a received signal strength at which the communication device receives the communications from the base station simulator;
to determine an absolute total isotropic sensitivity of the communication device receiver circuit in response to the measured bit error rate, the measured received signal strength, and the associated transmission power levels.

14. The system of claim 13, wherein the TIS measurement computer is further configured as follows:

for each of the plurality of different static positions of the mode stirrer device, to determine a combined chamber and antenna loss (CAL) value based on a difference between the measured received signal strength and the associated transmission power level from the base station simulator;

for each of the plurality of different static positions of the mode stirrer device, to determine an average CAL value using the determined CAL values that correspond to non-zero bit error rate measurements; and to determine an isotropic sensitivity of the communication device receiver circuit using the average CAL value determined for each of the plurality of different static positions of the mode stirrer device.

15. The system of claim 14, wherein the TIS measurement computer is further configured as follows:

for each of the plurality of different static positions of the mode stirrer device, to determine the isotropic sensitivity of the communication device receiver circuit based on a difference between the measured bit error rate and the average CAL value.

16. The system of claim 14, wherein the TIS measurement computer is further configured to determine an active antenna efficiency of the communication device receiver circuit receiving communications from the base station simulator, and to determine the absolute total isotropic sensitivity of the communication device receiver circuit in response to the determined isotropic sensitivity and the determined active antenna efficiency.

17. The system of claim 16, wherein the TIS measurement computer is further configured to determine the absolute total isotropic sensitivity of the communication device receiver circuit based on adding the determined isotropic sensitivity and the determined active antenna efficiency.

18. The system of claim 16, wherein the TIS measurement computer is further configured as follows:

while a substantially constant transmission power level from the base station simulator is maintained, to move the mode stirrer device to mix polarizations of incident RF fields in the SFC while measuring a received signal strength at which the communication device receives the communications from the base station simulator;

to average a plurality of the measurements of the received signal strength over time; and to determine the active antenna efficiency based on the averaged received signal strength.

19. The system of claim 18, wherein the TIS measurement computer is further configured to determine a transfer function of the SFC, and to determine the active antenna efficiency based on a difference between the transmission power level from the base station simulator and a sum of the transfer function of the SFC and the averaged received signal strength.

20. A non-transitory computer readable medium having computer-readable program code embodied in said medium for determining characteristics of a communication device receiver circuit within a scattered field chamber (SFC) that is receiving communications from a base station simulator, said computer-readable program code comprising:

computer readable program code configured to control movement of a mode stirrer device within the SFC to sequentially move the mode stirrer device to a plurality of different static positions, wherein the different static positions of the mode stirrer device are configured to differently mix polarizations of incident RF fields in the SFC;

computer-readable program code configured to, at each of a plurality of the different static positions of the mode stirrer device, vary the transmission power level from the base station simulator through a plurality of different transmission power levels;

computer readable program code configured to, at each of a plurality of the transmission power levels, measure a bit error rate and a received signal strength at which the communication device receives the communications from the base station simulator; and computer readable program code configured to determine an absolute total isotropic sensitivity of the communication device receiver circuit in response to the measured bit error rate, the measured received signal strength, and the associated transmission power levels.

* * * * *